United States Patent [19]

Brandis et al.

[11] Patent Number: 4,794,866
[45] Date of Patent: Jan. 3, 1989

[54] LINEAR MOTOR DRIVEN RAILWAY CAR

[75] Inventors: Curt Brandis, Bremen; Heinrich Schulze-Buxloh, Werl-Hilbeck; Siegfried Pirags, Hamm, all of Fed. Rep. of Germany

[73] Assignee: Maschinenfabrik Scharf GmbH, Fed. Rep. of Germany

[21] Appl. No.: 108,268

[22] Filed: Oct. 13, 1987

[30] Foreign Application Priority Data

Oct. 13, 1986 [DE] Fed. Rep. of Germany ....... 3634838

[51] Int. Cl.⁴ .......................... B60L 13/02; B61F 9/00; B61B 13/04
[52] U.S. Cl. ..................... 104/292; 104/294; 104/242; 104/120; 105/165
[58] Field of Search .............. 104/288, 290, 291, 292, 104/294, 118, 120, 242; 105/199.1, 199.3, 165, 166

[56] References Cited

U.S. PATENT DOCUMENTS

| | | | |
|---|---|---|---|
| 573,823 | 12/1896 | Leffler | 104/292 |
| 3,807,313 | 4/1974 | Koyanagi | 105/199.1 |
| 3,815,511 | 6/1974 | Dukowicz et al. | 104/292 |
| 3,834,316 | 9/1974 | Hennings | 104/290 |
| 3,845,721 | 11/1974 | Wagner | 104/290 |
| 3,847,089 | 11/1974 | Nelson | 104/291 |
| 3,881,427 | 5/1975 | Blume | 104/120 |
| 4,055,123 | 10/1977 | Heidelberg | 104/292 |

Primary Examiner—Robert B. Reeves
Assistant Examiner—Joseph D. Pape.
Attorney, Agent, or Firm—Toren, McGeady & Associates

[57] ABSTRACT

An electrical linear motor stator is fixedly disposed along a roadway. A car supported on at least two trucks is guided for movement along the roadway. The trucks are pivotally mounted to the car for rotation about a vertical axis. Permanent magnets for interacting with the stator have one end pivotally mounted to the vertical axis of the truck and an opposite end guided, for example, using rollers, for positive movement parallel to a vertical longitudinal central plane of the stator. In this way, the permanent magnet is mounted for transverse movement to the car to permit the car to negotiate small radius curves in the roadway while still maintaining good alignment between the permanent magnet and the stator.

13 Claims, 6 Drawing Sheets

LINEAR MOTOR DRIVEN RAILWAY CAR

FIELD AND BACKGROUND OF THE INVENTION

The present invention relates in general to transportation systems and, in particular, to a new and useful transport arrangement utilizing cars having magnets thereon which ride on a stator extending along a roadway and forming an electrical linear motor drive for the car.

Linear motor drives utilize a stator which extends along a roadway. A car for travelling along the roadway carries permanent magnets which interact with the stator for propelling the car along the roadway. There must be sufficiently great congruence between the permanent magnets and the roadway. This is particularly important in cases where relatively large payloads must be moved, such as those which have to be handled in underground mining, in the case of completely preassembled mining frames. The requirement of congruence between the permanent magnets and the stator can be met comparatively easily as long as the roadways are more or less straight, or their curves have long radii.

However, difficulties occur if long cars for carrying mining frames and having correspondingly long permanent magnets integrated into the cars, have to travel on drifts having tight curves with a radius of as little as 2 meters. At such places, the congruence of the stator with the permanent magnets which assures perfect propulsion of the cars can no longer be assured.

SUMMARY OF THE INVENTION

It is an object of the present invention to improve the transport system described above, such that even in tight curves in the roadway, especially in underground mining operations, congruence will be assured between the stator and the permanent magnets that are integrated in the cars to provide for trouble-free transport of heavy loads even on upgrades.

Accordingly, another object of the present invention is to provide a transport system, particularly for drifts in underground mines, comprising an electrical linear motor drive stator disposed fixedly along a roadway, said stator having a vertical longitudinal central plane, a car for guided movement along the roadway, at least one permanent magnet mounted to said car for movement with said car along the roadway and for transverse relative movement of said permanent magnet on said car, said permanent magnet having opposite end sections, and means for positively guiding both of said opposite end sections of said permanent magnet along the vertical longitudinal central plane of said stator.

A main concept of the invention involves the movability which is provided for the permanent magnets relative to the car. The permanent magnets are aligned with the long axis of the cars in their starting position, such that the permanent magnets will always align themselves with the course of the stator. For this purpose, the end sections of the permanent magnets and the vertical longitudinal central plane of the stator are used as clearly defined alignment aids. In this manner, especially in the case of a rather caterpillar-like series of two or more permanent magnets associated with a car, it is possible to assure that high propulsive power can be achieved by sufficient congruence between the permanent magnets and the stator, at a relatively low electrical installation cost.

One preferred embodiment of the invention pivotally connects one end of two permanent magnets to a rotation axis for a truck that supports the car, the opposite end of each permanent magnet being positively guided along the vertical longitudinal central plane of the stator. Since the cars used are equipped, as a rule, with two trucks which can swivel about vertical axes, so as to assure a sufficient ability to negotiate curves, the invention associates each end section of the permanent magnets incorporated in the cars with the swivel axes of the trucks, and the other end sections of the permanent magnets are guided in the vertical longitudinal central plane of the stator. The permanent magnets are therefore mounted so as to turn with respect to the cars and always place themselves with regard to the range of their guidance on the chord which intersects the vertical longitudinal central plane of the stator at right angles to the radius of the curve.

Since the trucks are usually situated in the end sections of the car, it is possible, according to one embodiment of the invention, for the permanent magnets to extend from the swivel axes of the truck toward the vertical central transverse plane of the car.

Another equally advantageous embodiment of the invention, which is to be used preferably in sections where there are many curves with especially short radii, uses two permanent magnets pivotally mounted to the swivel axis of each truck. In this case, four permanent magnets disposed in tandem are associated with each car. Permanent magnets are linked together in pairs at the swivel axis of each truck. Of these, one permanent magnet extends toward one end of the car and the other permanent magnet extends toward the vertical central transverse plane of the car.

The permanent magnets can advantageously be mounted in magnet holders which are mounted in the cars such that they can align themselves easily with the curved course of the stator and thus assure that the desired congruence between the permanent magnets and the stator will be preserved.

In a preferred linking of the magnet holders to a car, the magnet holders are resiliently connected to the car. In this manner, vibrations do not propagate from the magnet-stator system into the cars which would excite the cars to emit noise due to the high-frequency currents in the stator system. The nature of this resilient or spring mounting is dependent upon the particular local circumstances. Rubber mountings, coil springs or plate springs can be used.

Guidance of the end sections of the permanent magnets in their movements transversely of the car can be brought about in various ways. For example, two guide rollers turning on vertical axes can be disposed at these end sections. These guide rollers can rest on the outside of the stator or on a guide rail extending in the vertical central plane of the stator. This type of guidance can be used regardless of whether only two permanent magnets or, if desired, four permanent magnets are provided in a car.

According to another feature of the invention, the magnet holders are supported on the car on rollers. Positive guiding means with runners are also possible, however.

According to another advantageous embodiment of the invention, one end section of each permanent magnet is provided with a truck of its own, especially through a magnet holder. This truck is independent of the truck of the car.

A positive guidance of the trucks of the car and/or of the permanent magnets can be provided. Either the stator directly or a separate running rail which is parallel to the stator forms a positive guide for all trucks. A positive guide in which the permanent magnets rest against the stator and the trucks of the car rest on a separate rail can also be provided, however.

According to a still further feature of the invention, each of the trucks has guide rollers and running wheels, while the guide rollers run directly on the stator or on a guide rail running preferably in the vertical longitudinal central plane of the stator. The running wheels are supported preferably on separate guiding tracks beside the stator. These guiding tracks can be formed of flat guiding surfaces, e.g., concrete pavements, or can be formed from guiding rail sections. The trucks of the permanent magnets can additionally be provided with running wheels which provide for their movement relative to the car.

A still further object of the invention is to provide a travel system which is simple in design, rugged in construction and economical to manufacture.

The various features of novelty which characterize the invention are pointed with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
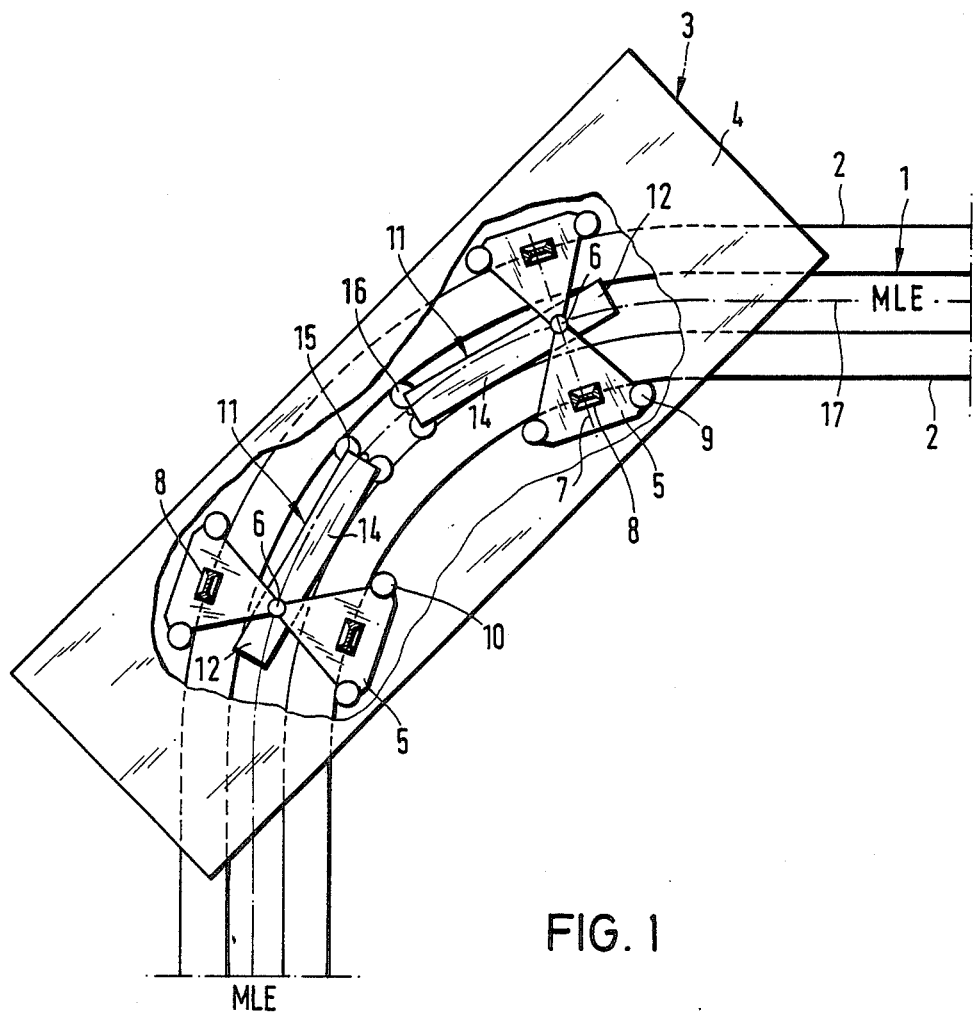
FIG. 1 is a diagrammatic top plan view, partially cut away, of a 90° bend in the track or roadway of an underground mine with a car thereon according to a first embodiment of the invention which is negotiating a curve.

In FIG. 1, the reference numeral 1 indicates a stator of an electrical linear motor drive which is laid along an underground mine drift. Two rails 2 run parallel alongside the stator 1 for the positive guidance of a car 3. The car 3 which may be assembled with other similar cars to form trains serve for the transport, for example, of completely preassembled face-working frames. For this purpose, the car 3 has platforms 4 with a length of about 4600 mm and a width of about 1500 mm.

The car 3 is supported by two trucks 5 which are pivotally mounted under platform 4 at vertical swivel axes 6. Trucks 5 run along the guide rails 2. The trucks 5 have for this purpose wheels 8 revolving about horizontal axes 7. Positive lateral guidance on the guide rails 2 is provided by guide rollers 10 revolving about vertical axes 9.

Furthermore, the swivel axes 6 of the trucks serve for the swivel mounting of permanent magnets 11 which cooperate with the stator 1 to propel car 3 on rails 2 in a known fashion. For this purpose, the permanent magnets 11 are guided each with an end section 12 about the axes of rotation 6 in the vertical central longitudinal plane MLE of the stator 1, while the opposite end sections 14 of the permanent magnets 11 which are adjacent one another are provided with guide rollers 16 which turn about vertical axes 15 and which bear against a guide rail 17 extending in the vertical central longitudinal plane MLE of the stator 1.

It can be seen that this positive guidance of the permanent magnets 11 assures that, even on tight curves, and with cars of large area, the congruence of the permanent magnets 11 with the stator 1 can be assured so as to achieve sufficient propulsive power.

Figure 2:
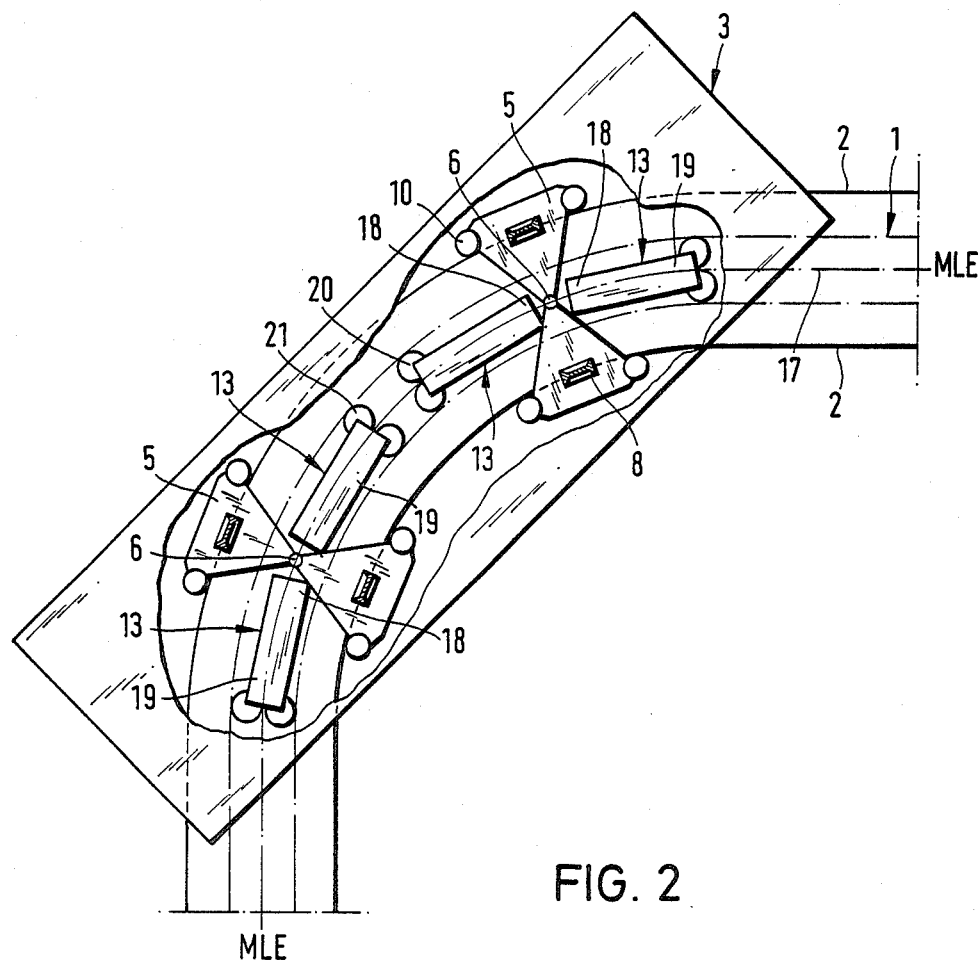
FIGS. 2 to 4 are views similar to FIG. 1 showing three additional embodiments of the invention.

The embodiment shown in FIG. 2 is largely the same as that of FIG. 1. The difference in the embodiment of FIG. 2 from that of FIG. 1 is only that now a total of four permanent magnets 13 are provided which are associated in pairs with each of the two trucks 5 of the car 3. It can be seen that the permanent magnets 13 are mounted each with one end section 18 at the vertical swivel axes 6 of the truck 5 and, at the other end section 19, they bear, by means of guide rollers 21 turning on vertical axes 20, against a guide rail 17 disposed in the vertical central longitudinal plane MLE of the stator 1.

Figure 3:
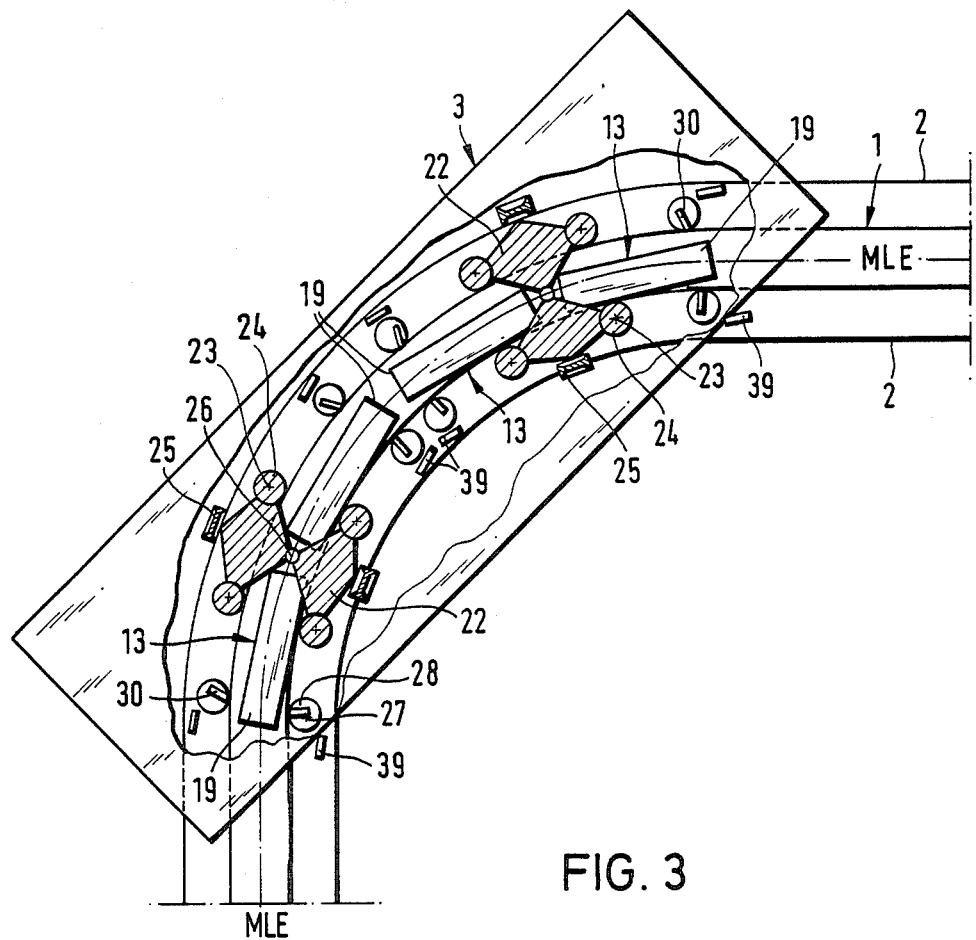

In the embodiment shown in FIG. 3, the trucks 22 of the car 3 are guided laterally against the stator 1 by means of guide rollers 24 revolving about vertical axes 23. The running wheels 25 of the truck 22 are supported on running rails 2 which are laid on the road parallel to the stator 1.

The swivel axes 26 of the truck 22 again form swivel bearings for permanent magnets 13 as in the embodiment shown in FIG. 2, and it can be seen that now guide rollers 28 turning about vertical axes 27 are provided at the free ends 19 of the permanent magnets and roll on the outside of the stator. The permanent magnets 13, like the permanent magnets 11 of FIGS. 1 and 2, are embedded in magnet holders 29 which are supported by transversely displaceable running rollers 30 in the car 3 (see FIG. 6). Also, magnet holders 41 (FIG. 5a) which are spring loaded at end sections 19 can be associated with the permanent magnets 13, with guiding wheels 39 mounted in steering levers 40. This provides for upgrades and downgrades of the roadway 36. The permanent magnets 13 can furthermore be spaced from the platform 4 by springs 37.

Figure 4:
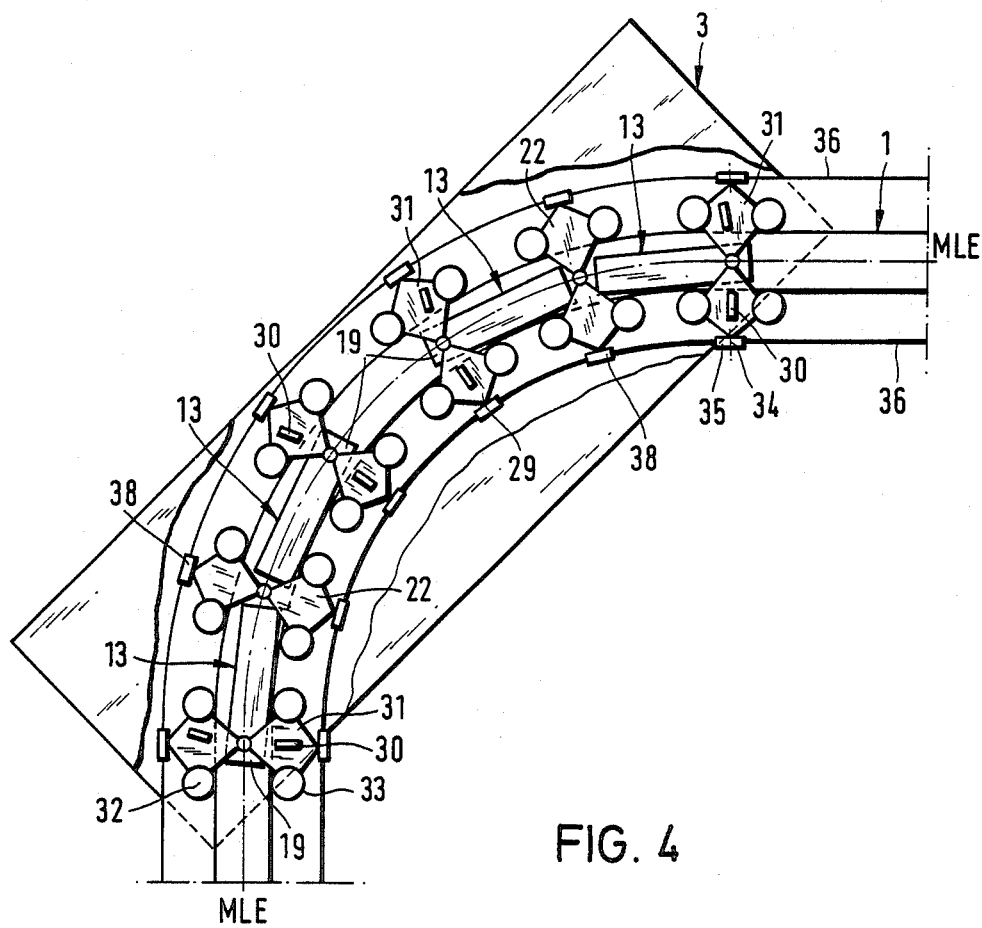
Figure 5:
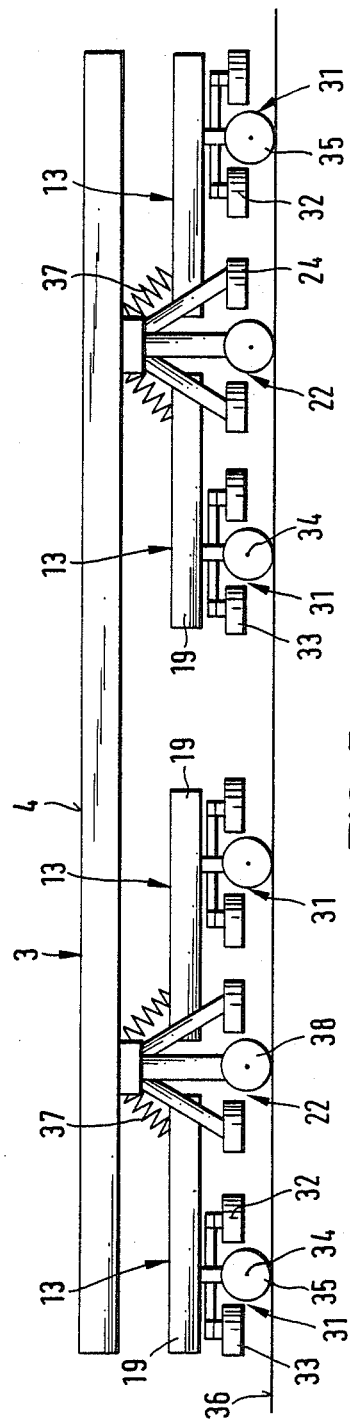
FIG. 5 is an enlarged side elevation of the car of FIG. 4, on a straight section of track or roadway.
Figure 5A:
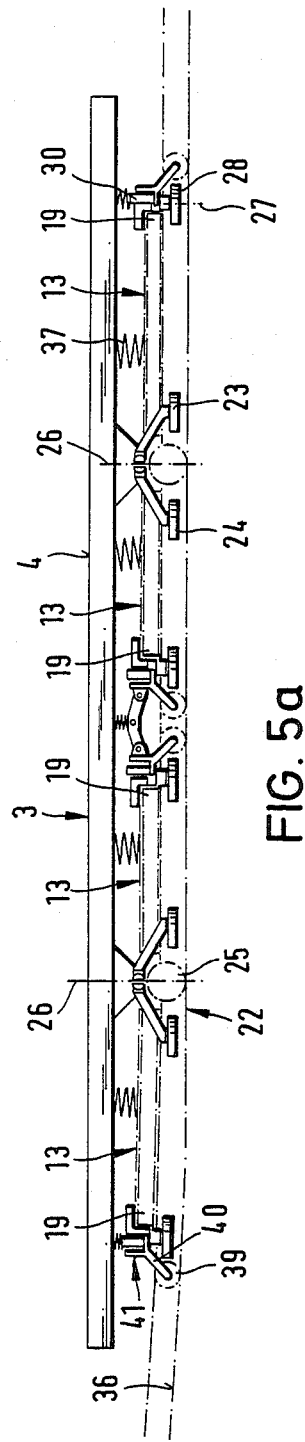
FIG. 5a is a side elevation of the car of FIG. 3.
Figure 6:
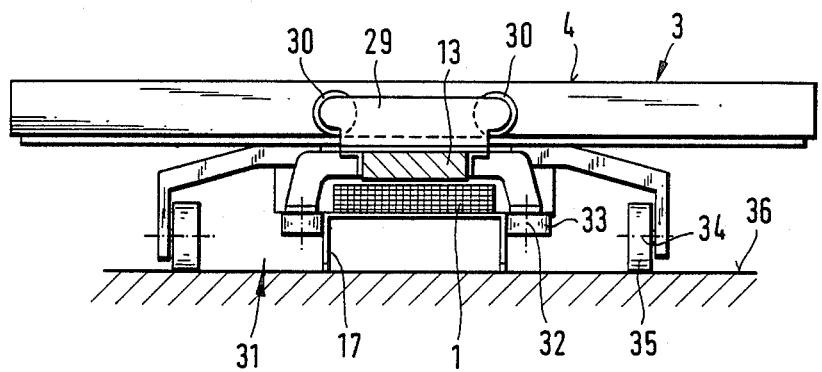
FIG. 6 is a front end view of the car of FIG. 4, running on a straight section of track or roadway.

In FIGS. 4, 5 and 6, an embodiment of a transport system is shown in which each of the permanent magnets 13 is supported at its free end sections 19 on a truck 31 of its own. Each truck 31 has, for this purpose, four guide rollers 33 turning on vertical axes 32 which roll on the sides of the stator 1 as well as two running wheels 35 turning on horizontal axes 34 and supported on a roadway 36 running parallel next to the stator 1. It can also be seen in FIGS. 4 and 6 that the trucks 31 for the permanent magnets 13 can be provided with transversely disposed running wheels 30 by which they are guided for cross movement in the car 3, as shown in FIG. 6.

The magnet holders 29 holding the permanent magnets 13 are supported on spring elements 37 in the area of the truck 22 of the car 3. This prevents the platforms 4 of the cars 3 from being excited to generate noise by the high-frequency currents of the linear motor system.

In the embodiment shown in FIGS. 4, 5 and 6, provision is also made for the truck 22 of the cars 3 to be supported by running wheels 38 on the roadway 36, unlike the case of the embodiment represented in FIG. 3.

While specific embodiments of the invention have been shown and described in detail to illustrate the application of the principles of the invention, it will be understood that the invention may be embodied otherwise without departing from such principles.

What is claimed is:

1. A transport system particularly for drifts in underground mines, comprising an electrical linear motor drive stator disposed fixedly along a roadway, said stator having a vertical longitudinal central plane, a car for guided movement along the roadway, at least one permanent magnet mounted to said car for movement with said car along the roadway, and for transverse relative movement on said car, said permanent magnet having opposite end sections, means for positively guiding both of said opposite end sections of said permanent magnet along the vertical longitudinal central plane of said stator, two spaced apart trucks rotatably mounted to said car about vertical axes, a second permanent magnet mounted to said car for movement with said car along the roadway, said second permanent magnet having opposite end sections, one end section of said first mentioned permanent magnet being pivotally mounted to said vertical axis of one of said trucks and one end section of the second permanent magnet being pivotally mounted to the vertical axis of the other of said trucks, and the opposite end section of each of said first mentioned and second permanent magnets being guided by said means along the vertical longitudinal central plane of said stator.

2. A transport system according to claim 1, including two additional permanent magnets each having one end respectively connected to one of said vertical axes of said two trucks, each of said two additional permanent magnets having opposite end sections guided by said means for movement along said vertical longitudinal central plane of said stator.

3. A transport system according to claim 2, wherein said permanent magnets pivotally mounted to said vertical axis of each of said two trucks are positioned on opposite sides of said vertical axis.

4. A transport system according to claim 3, including a magnet holder mounted for transverse movement to said car for each of said permanent magnets, each of said permanent magnets being embedded in its respective magnet holder.

5. A transport system particularly for drifts in underground mines, comprising an electrical linear motor drive stator disposed fixedly along a roadway, said stator having a vertical longitudinal central plane, a car for guided movement along the roadway, at least one permanent magnet mounted to said car for movement with said car along the roadway and for transverse relative movement on said car, said permanent magnet having opposite end sections, means for positively guiding both of said opposite end sections of said permanent magnet along the vertical longitudinal central plane of said stator, a magnet holder mounted for transverse movement to said car, said at least one permanent magnet being embedded in said magnet holder, said magnet holder including opposite ends positioned adjacent respective opposite end sections of said permanent magnet, one of said opposite ends of said magnet holder being pivotally mounted to said car for rotation about a vertical axis, said means for guiding said opposite end section of said permanent magnet, comprising two rollers rotatably mounted to said opposite end of said magnet holder and a guide rail extending parallel to the vertical longitudinal central plane of said stator, said rollers rolling on opposite sides of said guide rail.

6. A transport system according to claim 5, including resilient mounting means connected between said magnet holder and said car for resiliently supporting said magnet holder on said car.

7. A transport system according to claim 5, wherein said magnet holder includes at least one running wheel mounted for rotation about a horizontal axis for rolling against said car for the transverse movement of said magnet holder with respect to said car.

8. A transport system particularly for drifts in underground mines, comprising an electrical linear motor drive stator disposed fixedly along a roadway, said stator having a vertical longitudinal central plane, a car for guided movement along the roadway, at least one permanent magnet mounted to said car for movement with said car along the roadway and for transverse relative movement on said car, said permanent magnet having opposite end sections, means for positively guiding both of said opposite end sections of said permanent magnet along the vertical longitudinal central plane of said stator, said means for guiding said end sections of said permanent magnet along said vertical longitudinal central plane of said stator comprising a truck pivotally mounted about a vertical axis to one end section of said permanent magnet and guide means for positively guiding said truck along said stator.

9. A transport system according to claim 8, wherein said means comprises a plurality of rollers rolling against said stator for positively guiding said truck along said stator.

10. A transport system according to claim 9, including a further truck pivotally mounted to said car for rotation about a vertical axis, said permanent magnet having an end section opposite from said first mentioned truck which is pivotally mounted to said pivot axis of said further truck.

11. A transport system according to claim 8, including a rail extending parallel to said stator, said guide means guiding said truck along said rail.

12. A transport system according to claim 11, wherein said guide means comprises at least two rollers rotatably mounted about horizontal axes to said truck for rolling along a roadway, and at least two rollers mounted for rotation about vertical axes for rolling along opposite sides of said rail.

13. A transport device particularly for drifts in underground mines, comprising an electrical linear motor drive stator disposed fixedly along a roadway, said stator having a vertical longitudinal central plane, a car for guided movement along the roadway, at least one permanent magnet mounted to said car for movement with said car along the roadway and for transverse relative movement on said car, said permanent magnet having opposite end sections, means for positively guiding both of said opposite end sections of said permanent magnet along the vertical longitudinal central plane of said stator, a magnet holder for carrying said permanent magnet, said magnet holder having opposite ends adjacent respective opposite end sections of said permanent magnet, a steering lever jornalled to one end of said magnet holder for moving over the roadway, spring means engaged between said one end of said magnet holder and said car for resiliently mounting said magnet holder to said car, and a guide roller rotatably mounted to said steering lever for rolling along said roadway.

* * * * *